US012786677B2

(12) United States Patent
Gupta et al.

(10) Patent No.: US 12,786,677 B2
(45) Date of Patent: Nov. 3, 2026

(54) LOCKING A DEVICE USING BLUETOOTH CHANNEL SOUNDING IN A CONNECTED DEVICE CONTEXT

(71) Applicant: MOTOROLA MOBILITY LLC, Wilmington, DE (US)

(72) Inventors: Ranjeet Gupta, Aurora, IL (US); Vishwanath K M, Bengaluru (IN); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 188 days.

(21) Appl. No.: 18/621,966

(22) Filed: Mar. 29, 2024

(65) Prior Publication Data

US 2025/0310742 A1 Oct. 2, 2025

(51) Int. Cl.
*H04W 4/80* (2018.01)

(52) U.S. Cl.
CPC .................................... *H04W 4/80* (2018.02)

(58) Field of Classification Search
CPC ..... H04W 4/80; H04W 28/021; H04W 12/00; H04W 8/00; H04W 40/38
See application file for complete search history.

(56) References Cited

U.S. PATENT DOCUMENTS 8,713,211 B2 * 4/2014 Yu ............................ G06F 3/00 710/16
11,500,476 B1 * 11/2022 Chen ...................... G08B 21/02
2016/0035213 A1 * 2/2016 Choi ..................... H04W 4/023 340/669
2016/0105542 A1 * 4/2016 Lee ................... H04M 1/72403 455/566
2016/0277891 A1 * 9/2016 Dvortsov ................ H04W 4/12
2019/0124473 A1 * 4/2019 Yoshida ................ G06F 3/1285
2019/0286806 A1 * 9/2019 Robinson .............. H04W 12/10
2019/0361694 A1 * 11/2019 Gordon ................... G06F 9/452
2022/0092604 A1 * 3/2022 Kwatra .............. G06Q 20/4014
2022/0322042 A1 * 10/2022 Su .......................... H04W 76/15
2023/0015612 A1 * 1/2023 Jung ................... H04L 63/0428
2023/0161443 A1 * 5/2023 Ziraknejad .............. G06F 3/044 327/517

(Continued)

*Primary Examiner* — Md K Talukder
(74) *Attorney, Agent, or Firm* — Isidore PLLC

(57) ABSTRACT

A method provides techniques for device locking using Bluetooth Low Energy Channel Sounding. The method includes receiving, by a processor of an electronic device that includes a Bluetooth Low Energy (BLE) interface, a motion initiation message from a second electronic device while the electronic device is unlocked, the second electronic device being communicatively linked with the electronic device for BLE channel sounding and distance measurement. The method further includes initiating a BLE Channel Sounding (BLECS) process using a distance calculation algorithm, where the BLECS process includes sending periodic channel sounding subevents and obtaining distance measurement results corresponding to the periodic channel sounding subevents. The method includes determining a current distance between the electronic device and the second electronic device based on the distance measurement results, and in response to determining that the current distance exceeds a predetermined distance threshold, invoking a lock screen on the electronic device.

20 Claims, 9 Drawing Sheets

(56) References Cited

U.S. PATENT DOCUMENTS

| | | | | |
|---|---|---|---|---|
| 2023/0283994 | A1* | 9/2023 | Shi | H04W 4/12 370/329 |
| 2023/0417890 | A1* | 12/2023 | Jiang | G01S 11/14 |
| 2025/0216530 | A1* | 7/2025 | Scagnol | H04L 63/18 |
| 2025/0298140 | A1* | 9/2025 | Kakuya | G01S 7/006 |
| 2025/0310742 | A1* | 10/2025 | Gupta | H04W 4/80 |

* cited by examiner

LOCKING A DEVICE USING BLUETOOTH CHANNEL SOUNDING IN A CONNECTED DEVICE CONTEXT

BACKGROUND

1. Technical Field

The present disclosure generally relates to electronic devices, and more specifically to electronic devices that support a locked state and an unlocked state.

2. Description of the Related Art

Computers, such as a laptop, workstation, or desktop, can enable the storage of vast amounts of sensitive information in a secure and organized manner. The information can include personal data, financial records, intellectual property, and more. Moreover, computers facilitate access to sensitive information, allowing device users to retrieve, modify, and share data as needed, including accessing user online accounts with stored login credential/authentication data. In conjunction with these benefits, computers also present challenges in managing sensitive information. These challenges include unauthorized access by persons who are in vicinity of the computer, whenever the user leaves the location of computer.

Accordingly, computer firmware/operating systems provide a security access feature on most computers that allows the user to lock the device by physically selecting a lock option, placing the device in sleep mode, or triggering the lock for a laptop by closing the laptop screen. A user locking an unattended computer prevents unauthorized access to files, applications, and sensitive information, especially in an office or other non-private or public environment, where multiple people may have access to the unlocked computer. The practice of locking an unattended computer helps maintain the confidentiality of the data the computer contains and/or can access, and prevents unauthorized individuals from viewing or tampering with sensitive information. Moreover, in some cases, there are regulations that may require data protection measures, including locking computers when unattended, to ensure compliance.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
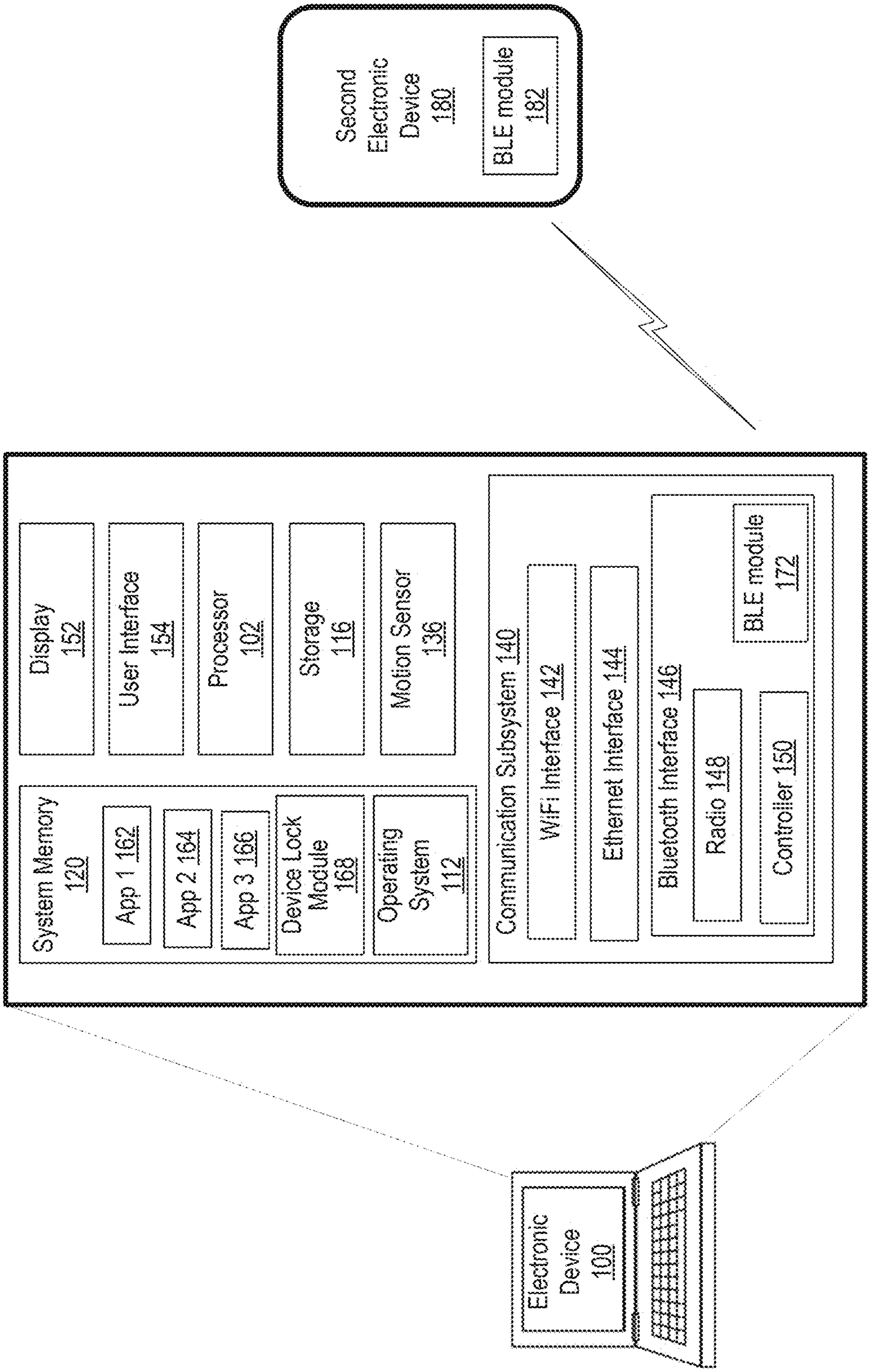
FIG. 1 depicts an example component makeup of an electronic device with specific components that enable locking the electronic device using Bluetooth channel sounding in a connected device context, according to one or more embodiments.

According to aspects of the present disclosure, an electronic device, a method, and a computer program product provide techniques for locking an electronic device using Bluetooth channel sounding in a connected device context. In one or more embodiments, a connected device context can include operating conditions of two electronic devices in which the two electronic devices are in a paired or linked state. BLE (Bluetooth Low Energy) Channel Sounding is a technique used in BLE communication to assess the quality and characteristics of the communication channel between a transmitter (e.g., a BLE device) and a receiver (e.g., a smartphone or another BLE device). Channel sounding involves transmitting information and known signals and analyzing the received signals to measure various channel parameters, such as signal strength, signal-to-noise ratio, and multipath effects. The information, which includes information transmitted as channel sounding subevents information, can be used for accurate distance estimation between two electronic devices. Disclosed embodiments utilize BLE Channel Sounding (BLECS) to determine a distance between two electronic devices as a criterion for locking at least one of the electronic devices.

A user can occasionally forget to lock his/her computer when stepping away from the location of the computer, whether for a short break or for an extended period, such as when leaving the computer in an office or at a workstation at the end of a work day. In a busy or fast-paced environment, individuals may forget to lock their computers due to the pressure to quickly move on to the next task. People may have the intention to lock their computers but get distracted by other tasks or thoughts. Additionally, simple forgetfulness can also be a common reason. Further, some individuals may feel a sense of security or comfort in their work environment, leading them to be less vigilant about locking their computers out of habit or a belief that nothing will happen. Moreover, some users may not be fully aware of the importance of locking their computers or the potential risks of leaving the computer unattended, especially in shared or public spaces. In environments where everyone is known and presumably trusted, there may be a false sense of security that leads individuals to believe that locking their computers is unnecessary. The aforementioned factors, as well as others, can result in computers such as desktop computers, laptop computers, workstations, and the like, being left unlocked while unattended, thereby resulting in potential security compromises.

The disclosed embodiments alleviate the aforementioned issues by using BLE Channel Sounding to determine the distance between a first electronic device (e.g., a laptop) and a second electronic device (e.g., a smartphone) that the user typically carries when leaving the area of the computer. In one or more embodiments, for the purposes of locking an electronic device based on the proximity of a second electronic device, the BLE Channel Sounding technique is used in place of, or in addition to RSSI (Received Signal Strength Indication). With RSSI, a stronger RSSI value indicates that the devices are closer to each other, while a weaker RSSI value suggests they are farther apart. Although RSSI can be used to provide a rough estimate of distance between two Bluetooth devices, it is much less accurate than BLE channel sounding, and furthermore, can be influenced by factors other than distance, such as signal interference and device orientation. RSSI can be affected by signal interference from other devices or environmental factors, leading to inaccurate distance measurements. Additionally, the relationship between RSSI and distance is non-linear and can vary based on factors such as signal propagation conditions, antenna orientation, and device hardware. The non-linearity can make it challenging to accurately estimate distance based on RSSI alone. Furthermore, multipath propagation, where signals bounce off objects and arrive at the receiver through multiple paths, can distort the RSSI measurements and lead to inaccurate distance estimates. Complicating the use of RSSI even more, different devices can have varying RSSI values for the same distance, depending on factors such as antenna design, transmit power, and receiver sensitivity. This variation can result in inconsistency and unreliability in distance measurements. The inaccuracies of the RSSI technique can create false positives (a device locks when it should not lock), and more seriously, can create false negatives (a device does not lock when it should lock). By using the more robust BLE Channel Sounding to determine the distance between devices, disclosed embodiments can provide improvements in automatic locking of an electronic device, increasing the security of information that is contained in and/or accessible by the electronic device.

According to one or more embodiments, a first electronic device (e.g., a laptop) is automatically locked (i.e., a lock screen is presented on the display of the first electronic device, requiring entry of a security credential or authorized second device signature to provide access to use the first electronic device) when a second electronic device (e.g., smartphone) is beyond a predetermined distance away, as determined by a BLE Channel Sounding technique. Since the BLE Channel Sounding process can consume power, one or more embodiments utilize motion detection on the second electronic device to initiate the BLE Channel sounding process. When motion of the second electronic device is detected, (i.e., via motion sensors, such as accelerometers, gyroscopes, and/or WiFi-based motion detection) a motion initiation message is sent from the second electronic device to the first electronic device. The first electronic device initiates the BLE Channel Sounding (BLECS) process, using a distance calculation algorithm to compute, with greater precision than an RSSI technique, a distance between the two devices, and the first electronic device locks based on the determined distance exceeding a predetermined threshold. According to one or more embodiments, a time interval is used as an additional criterion to prevent excessive lock-unlock cycles. As an example, if a user briefly steps out of distance range with the second electronic device for less than a pre-set threshold time (e.g., for five seconds) and the user then brings the second electronic device back in range, the device may remain unlocked, thereby avoiding excessive locking and unlocking while still promoting device security.

One or more embodiments can include an electronic device including: a communication subsystem that communicatively connects the electronic device to an electronically paired second electronic device, where the communication subsystem includes a Bluetooth Low Energy (BLE) interface; a processor; and a memory storing instructions executable in the processor, the instructions when executed causing the processor to configure the electronic device to: receive a motion initiation message from the second electronic device while the electronic device is unlocked; initiate a BLE Channel Sounding (BLECS) process using a distance calculation algorithm, wherein the BLECS process comprises sending periodic channel sounding subevents, and obtaining distance measurement results corresponding to the periodic channel sounding subevents; determine a current distance between the electronic device and the second electronic device based on the distance measurement results; and in response to determining that the current distance exceeds a predetermined distance threshold, invoke a lock screen on the electronic device.

One or more embodiments can provide a method including: receiving, by a processor of an electronic device that includes a Bluetooth Low Energy (BLE) interface, a motion initiation message from a second electronic device while the electronic device is unlocked; initiating a BLE Channel Sounding (BLECS) process using a distance calculation algorithm, wherein the BLECS process comprises sending periodic channel sounding subevents, and obtaining distance measurement results corresponding to the periodic channel sounding subevents; determining a current distance between the electronic device and the second electronic device based on the distance measurement results; and in response to determining that the current distance exceeds a predetermined distance threshold, invoking a lock screen on the electronic device.

One or more embodiments can include a computer program product including a non-transitory computer readable medium having program instructions that when executed by a processor of an electronic device that includes a Bluetooth Low Energy (BLE) interface, the processor configures the electronic device to perform above presented method functions.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) and second electronic device 200 (FIG. 2) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of an electronic device with specific components that enable locking the electronic device using Bluetooth channel sounding in a connected device context, according to one or more embodiments. An electronic device 100 can include a laptop computer, desktop computer, workstation, tablet computer, and/or other suitable computing device. Electronic device 100 can include one or more components as indicated. The components can include a processor 102. The processor 102 can include one or more processing cores, memory management units, floating-point units, graphics processing units, input/output units, and/or other functional blocks. Electronic device 100 can further include system memory 120. The system memory 120 can include a combination of dynamic random-access memory (DRAM), static random-access memory (SRAM), flash memory, and/or other suitable memory types. The system memory can include an operating system 112, such as Windows®, Linux, Unix, MacOS, and/or other suitable operating system. System memory 120 can store multiple applications, indicated as App1 162, App2 164, App3 166, and device lock module 168. Each module and/or application provides program instructions/code that are processed by processor 102 to configure processor 102 and/or other components of electronic device 100 to perform specific operations, as described herein.

Electronic device 100 may further include storage 116. Storage 116 can include one or more hard disks, such as magnetic hard disks, solid-state hard disks, and/or other suitable storage technology. Electronic device 100 may further include user interface 154. User interface 154 can include peripheral devices such as a keyboard, mouse, trackball, and the like. Electronic device 100 may further include a display 152. The display 152 can include an LED (Light-Emitting diode) display, OLED (Organic Light-Emitting diode) display, or other suitable display type. In one or more embodiments, the display 152 can include a touch-screen, enabling the display 152 to also serve as part of the user interface 154.

Electronic device 100 may further include communication subsystem 140. The communication subsystem 140 may include hardware to support various layers of communication, such as the physical layer (Layer 1), link layer (Layer 2), and/or other layers according to the OSI (Open Systems Interconnection) model. The communication subsystem 140 can include a WiFi interface 142. The WiFi interface 142 can include modulators, demodulators, transmitters, and receivers to implement a variety of WiFi standards such as IEEE 802.11ac (Wi-Fi 5), IEEE 802.11ax (Wi-Fi 6), IEEE 802.11be (Wi-Fi 7), and/or other suitable standards. The communication subsystem 140 can include an Ethernet interface 144. The Ethernet interface can include a connector, such as an RJ45 connector, as well as an Ethernet controller that is configured to send and receive Ethernet frames over the network. The Ethernet controller may further include non-volatile memory to store a unique Media Access Control (MAC) address, serial number, and/or other information.

Electronic device 100 further includes a Bluetooth interface 146. The Bluetooth interface 146 can include a Bluetooth radio 148 operating on the 2.4 GHz band and utilizing frequency-hopping spread spectrum (FHSS) to avoid interference. The Bluetooth interface 146 can further include a Bluetooth controller 150 to manage the Bluetooth radio 148 handling tasks such as establishing connections, managing data transmission, and handling security features. Bluetooth interface 146 also interfaces with the device's operating system.

The Bluetooth interface 146 further includes a Bluetooth Low Energy (BLE) module 172. The BLE module 172 can include a BLE radio. The BLE radio may operate in a similar frequency range as Bluetooth radio 148, but may utilize a different modulation scheme to achieve lower power consumption. The BLE module 172 may further include a BLE controller to manage the BLE radio and handle tasks such as establishing connections, managing data transmission, and handling channel sounding functions.

The electronic device 100 can further include a motion sensor 136. The motion sensor 136 can include one or more electromechanical devices, such as accelerometers, gyroscopes, and/or other suitable motion-detecting devices. The motion sensor 136 may include hardware for determining motion based on changing radio signals, such as specialized hardware to analyze changes in the Wi-Fi signal strength and phase caused by motion. By comparing these changes to a baseline signal, the sensor can detect and track motion.

Electronic device 100 can communication with second electronic device 180 via Bluetooth. In one or more embodiments, second electronic device 180 may include a smartphone, smartwatch, or other suitable portable computing device. Second electronic device 180 includes BLE module 182, which may have capabilities and functions similar to that of BLE module 172 in electronic device 100. According to one or more embodiments, when the second electronic device 180 detects motion, such as when being carried by a person as the person walks, the second electronic device 180 sends a motion initiation message to the electronic device 100, causing the electronic device 100 to initiate a BLE Channel Sounding (BLECS) process using a distance calculation algorithm. In one or more embodiments, the distance calculation algorithm includes at least one of Time of Flight (ToF), Channel Impulse Response (CIR), Angle of Arrival (AoA), and Time Difference of Arrival (TDoA). The ToF approach can include measuring a time difference between the transmission of a known signal and the reception of the corresponding signal at the receiver. The time delay is then used to estimate the distance between the transmitter and the receiver. One or more embodiments can utilize a Channel Impulse Response (CIR) for distance measurements. The CIR algorithm enables characterization of the response of a communication channel to a short-duration pulse, known as an impulse. In one or more embodiments, the CIR algorithm provides information about the channel characteristics, including, but not limited to, multipath propagation, delay spread, and frequency-selective fading. One or more embodiments can utilize Angle of Arrival (AoA). An AoA algorithm can be used to estimate the direction from which a signal arrives at a receiver. The directional information can be used for various purposes, such as beamforming, spatial diversity, and localization. One or more embodiments can utilize multiple antennas at the receiver to measure the phase difference or time delay of the signal received at each antenna. By analyzing these differences, the AoA algorithm can estimate the angle of arrival of the signal relative to the array of antennas. The angle information can be used for estimation of location and/or distance. One or more embodiments can utilize TDoA. In TDoA, each receiver measures the time difference between the arrival of the signal and a reference time, which is often the time of transmission. By comparing these time differences across multiple receivers, it is possible to estimate the difference in the distances between the transmitter and each receiver. With the known locations of the receivers, these differences can be used to triangulate the position of the transmitter. Other algorithms may be used instead of, or in addition to, the aforementioned algorithms in one or more embodiments.

In one or more embodiments, the motion initiation message is sent from second electronic device 180 to electronic device 100 via Bluetooth. However, other techniques may be used to send the motion initiation message, including, but not limited to, WiFi, infrared, Zigbee, and/or other wireless communication protocols. When the electronic device 100 determines that the distance between the electronic device 100 and the second electronic device 180 exceeds a predetermined threshold, the electronic device 100 enters a lock state, which requires authentication in order to unlock the electronic device. In one or more embodiments, device lock module 168 includes instructions, that when executed by processor 102, the processor configures the electronic device 100 to lock, preventing user access, based on a distance between the electronic device 100 and second electronic device 180, as determined by a BLE Channel Sounding process.

Figure 2:
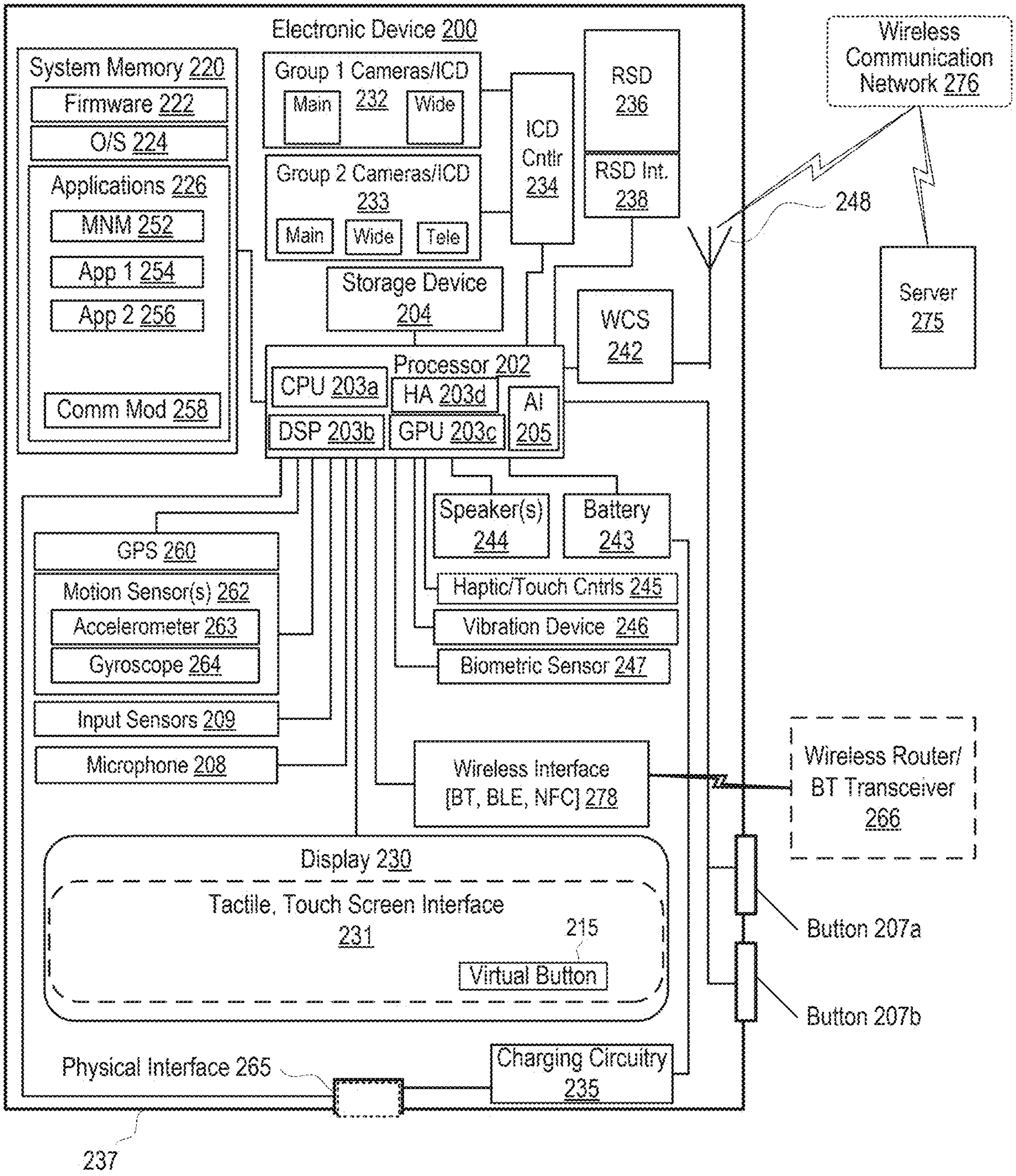
FIG. 2 depicts an example component makeup of a second electronic device with specific components that operate with the electronic device of FIG. 1 to enable locking the electronic device using Bluetooth channel sounding in a connected device context, according to one or more embodiments.

FIG. 2 illustrates an example component makeup of electronic device 200, which may be similar to second electronic device 180 shown in FIG. 1. Examples of electronic device 200 include, but are not limited to, mobile devices, a notebook computer, a mobile phone, a smart phone, a digital camera with enhanced processing capabilities, a smart watch, a tablet computer, and other types of electronic device.

Electronic device 200 includes processor 202 (typically as a part of a processor integrated circuit (IC) chip), which includes processor resources such as central processing unit (CPU) **203*a*, communication signal processing resources such as digital signal processor (DSP) 203*b*, graphics processing unit (GPU) 203*c***, and hardware acceleration (HA)

unit 203*d*. In some embodiments, the hardware acceleration (HA) unit 203*d* may establish direct memory access (DMA) sessions to route network traffic to various elements within electronic device 200 without direct involvement from processor 202 and/or operating system 224. Processor 202 can interchangeably be referred to as controller 202.

Processor 202 can, in some embodiments, include image signal processors (ISPs) (not shown) and dedicated artificial intelligence (AI) engines 205. In one or more embodiments, processor 202 can execute AI modules to provide AI functionality of AI engines 205. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output. Controller 202 is communicatively coupled to storage device 204, system memory 220, input devices (introduced below), output devices, including integrated display 230, and image capture device (ICD) controller 234.

ICD controller 234 can perform image acquisition functions in response to commands received from processor 202 in order to control group 1 ICDs 232 and group 2 ICDs 233 to capture video or still images of a local scene within a FOV of the operating/active ICD. In one or more embodiments, group 1 ICDs can be front-facing, and group 2 ICDs can be rear-facing, or vice versa. Throughout the disclosure, the term image capturing device (ICD) is utilized interchangeably to be synonymous with and/or refer to any one of the cameras 232, 233. Both sets of cameras 232, 233 include image sensors that can capture images that are within the field of view (FOV) of the respective camera 232, 233.

In one or more embodiments, the functionality of ICD controller 234 is incorporated within processor 202, eliminating the need for a separate ICD controller. Thus, for simplicity in describing the features presented herein, the various camera selection, activation, and configuration functions performed by the ICD controller 234 are described as being provided generally by processor 202. Similarly, manipulation of captured images and videos are typically performed by GPU 203*c* and certain aspects of device communication via wireless networks are performed by DSP 203*b*, with support from CPU 203*a*. However, for simplicity in describing the features of the electronic device 200, the functionality provided by one or more of CPU 203*a*, DSP 203*b*, GPU 203*c*, and ICD controller 234 are collectively described as being performed by processor 202. Collectively, components integrated within processor 202 support computing, classifying, processing, transmitting and receiving of data and information, and presenting of graphical images within a display.

System memory 220 may be a combination of volatile and non-volatile memory, such as random-access memory (RAM) and read-only memory (ROM). System memory 220 can store program code or similar data associated with firmware 222, an operating system 224, and/or applications 226. During device operation, processor 202 processes program code of the various applications, modules, OS, and firmware, that are stored in system memory 220.

In accordance with one or more embodiments, applications 226 include, without limitation, motion notification module (MNM) 252 and other applications, indicated as App1 254 and App2 256, and communication module 258. Each module and/or application provides program instructions/code that are processed by processor 202 to cause processor 202 and/or other components of electronic device 200 to perform specific operations, as described herein. Descriptive names assigned to these modules add no functionality and are provided solely to identify the underlying features performed by processing the different modules. For example, motion notification module (MNM) 252 can include program instructions for implementing features of disclosed embodiments, such as sending a motion initiation message to the electronic device 100 (FIG. 1) when the second electronic device 180 (FIG. 1) is in motion.

In one or more embodiments, electronic device 200 includes removable storage device (RSD) 236, which is inserted into RSD interface 238 that is communicatively coupled via system interlink to processor 202. In one or more embodiments, RSD 236 is a non-transitory computer program product or computer readable storage device encoded with program code and corresponding data, and RSD 236 can be interchangeably referred to as a non-transitory computer program product. RSD 236 may have a version of one or more of the applications (e.g., 252, 254, 256, 258) and motion notification module (MNM) 252 stored thereon. Processor 202 can access RSD 236 to provision electronic device 200 with program code that, when executed/processed by processor 202, the program code causes or configures processor 202 and/or generally electronic device 200, to provide the various functions described herein.

Electronic device 200 includes an integrated display 230 which incorporates a tactile, touch screen interface 231 that can receive user tactile/touch input. As a touch screen device, integrated display 230 allows a user to provide input to or to control electronic device 200 by touching features within the user interface presented on display 230. Tactile, touch screen interface 231 can be utilized as an input device. The touch screen interface 231 can include one or more virtual buttons, indicated generally as 215. In one or more embodiments, when a user applies a finger on the touch screen interface 231 in the region demarked by the virtual button 215, the touch of the region causes the processor 202 to execute code to implement a function associated with the virtual button. In some implementations, integrated display 230 is integrated into a front surface of electronic device 200 along with front ICDs, while the higher quality ICDs are located on a rear surface.

Electronic device 200 can further include microphone 208, one or more output devices such as speakers 244, and one or more input buttons, indicated as 207*a* and 207*b*. While two buttons are shown in FIG. 2, other embodiments may have more or fewer input buttons. Microphone 208 can also be referred to as an audio input device. In some embodiments, microphone 208 may be used for identifying a user via voiceprint, voice recognition, and/or other suitable techniques. Input buttons 207*a* and 207*b* may provide controls for volume, power, and ICDs 232, 233. Additionally, electronic device 200 can include input sensors 209 (e.g., sensors enabling gesture detection by a user).

Electronic device 200 further includes haptic touch controls 245, vibration device 246, fingerprint/biometric sensor 247, global positioning system (GPS) module 260, and motion sensor(s) 162. Vibration device 246 can cause electronic device 200 to vibrate or shake when activated. Vibration device 246 can be activated during an incoming call or message in order to provide an alert or notification to a user of electronic device 200. According to one aspect of the disclosure, integrated display 230, speakers 244, and vibration device 246 can generally and collectively be referred to as output devices.

Biometric sensor 247 can be used to read/receive biometric data, such as fingerprints, to identify or authenticate a user. In some embodiments, the biometric sensor 247 can supplement an ICD (camera) for user detection/identification.

GPS module 260 can provide time data and location data about the physical location of electronic device 200 using geospatial input received from GPS satellites. Motion sensor(s) 262 can include one or more accelerometers 263 and gyroscope 264. Motion sensor(s) 262 can detect movement of electronic device 200 and provide motion data to processor 202 indicating the spatial orientation and movement of electronic device 200. Accelerometers 263 measure linear acceleration of movement of electronic device 200 in multiple axes (X, Y and Z). Gyroscope 264 measures rotation or angular rotational velocity of electronic device 200. In one or more embodiments, movement detected by the GPS module 260, motion sensor(s) 262, and/or gyroscope 264 can cause the processor 202 to send a motion initiation message to electronic device 100 (FIG. 1) to cause electronic device 100 (FIG. 1) to initiate a BLE channel sounding process. Electronic device 200 further includes a housing 237 (generally represented by the thick exterior rectangle) that contains/protects the components internal to electronic device 200.

Electronic device 200 also includes a physical interface 265. Physical interface 265 of electronic device 100 can serve as a data port and can be used as a power supply port that is coupled to charging circuitry 235 and device battery 243 to enable recharging of device battery 243 and/or powering of device.

Electronic device 200 further includes wireless communication subsystem (WCS) 242, which can represent one or more front end devices (not shown) that are each coupled to one or more antennas 248. In one or more embodiments, WCS 242 can include a communication module with one or more baseband processors or digital signal processors, one or more modems, and a radio frequency (RF) front end having one or more transmitters and one or more receivers. Example communication module 258 within system memory 220 enables electronic device 200 to communicate with wireless communication network 276 and with other devices, such as server 275 and other connected devices, via one or more of data, audio, text, and video communications. Communication module 258 can support various communication sessions by electronic device 200, such as audio communication sessions, video communication sessions, text communication sessions, exchange of data, and/or a combined audio/text/video/data communication session.

WCS 242 and antennas 248 allow electronic device 200 to communicate wirelessly with wireless communication network 276 via transmissions of communication signals to and from network communication devices, such as base stations or cellular nodes, of wireless communication network 276. Wireless communication network 276 further allows electronic device 200 to wirelessly communicate with server 275, and other communication devices, which can be similarly connected to wireless communication network 276. In one or more embodiments, various functions that are being performed on communications device 200 can be supported using or completed via/on server 275.

Electronic device 200 can also wirelessly communicate, via wireless interface(s) 278, with wireless communication network 276 via communication signals transmitted by short range communication device(s). Wireless interface(s) 278 can be a short-range wireless communication component providing Bluetooth, Bluetooth Low Energy (BLE), near field communication (NFC), and/or wireless fidelity (Wi-Fi) connections. In one or more embodiments, electronic device 200 can receive Internet or Wi-Fi based calls, text messages, multimedia messages, and other notifications via wireless interface(s) 278. In one or more embodiments, electronic device 200 can communicate wirelessly with external wireless device 266, such as a WiFi router or BT transceiver, via wireless interface(s) 278. In one or more embodiments, WCS 242 with antenna(s) 248 and wireless interface(s) 278 collectively provide wireless communication interface(s) of electronic device 200.

Electronic device 200 of FIG. 2 is only a specific example of a device that can be used to implement and/or operate with the embodiments of the present disclosure. Devices that utilize aspects of the disclosed embodiments can include, but are not limited to, a smartphone, a tablet computer, a laptop computer, a desktop computer, a wearable computer, and/or other suitable electronic device.

Figure 3:
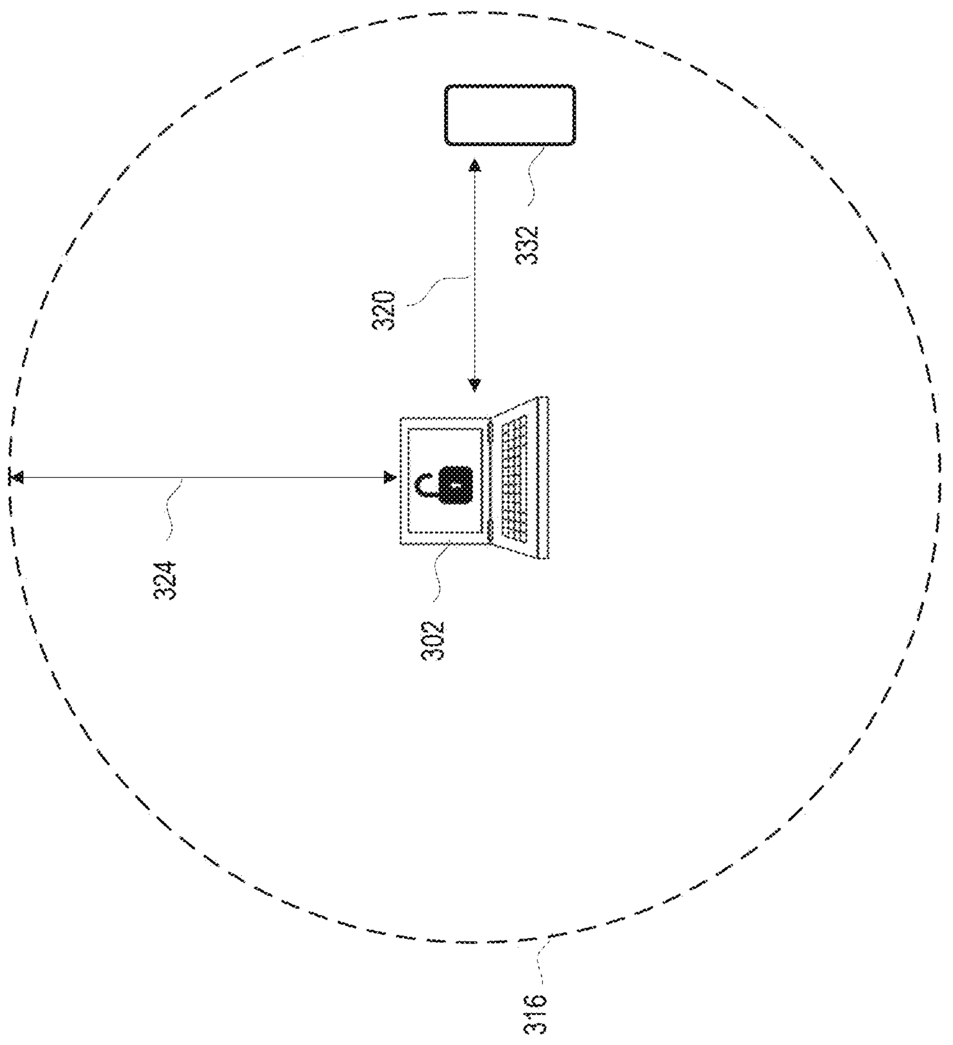
FIG. 3 depicts an example of an electronic device in an unlocked state, according to one or more embodiments.

FIG. 3 depicts an example of a device in an unlocked state, according to one or more embodiments. Electronic device 302 may be an electronic device similar to that shown and described as electronic device 100 in FIG. 1. Second electronic device 332 may be an electronic device similar to that shown and described as electronic device 180 in FIG. 1 and/or device 200 in FIG. 2. In one or more embodiments, a predetermined distance threshold 324 is established. In embodiments, the predetermined distance threshold 324 can be selected by a user, and/or an administrator. In one or more embodiments, a default predetermined distance threshold may be established by the device lock module 168 (FIG. 1). In one or more embodiments, predetermined distance threshold is a value ranging from 50 centimeters to 60 centimeters. In one or more embodiments, the predetermined default distance threshold ranges from 0.5 meters to 2 meters. Other values are possible in other embodiments. In one or more embodiments, the predetermined distance threshold 324 serves as a radius of a security region 316. In one or more embodiments, in response to the second electronic device 332 being positioned outside of the security region 316, an automatic device locking process for electronic device 302 is initiated. In one or more embodiments, electronic device 302 and second electronic device 332 may be electronically paired a priori as part of an initial setup process. The electronic pairing can include Bluetooth pairing. In one or more embodiments, a BLE channel sounding process measures the distance 320 between electronic device 302 and second electronic device 332. If the distance 320 is less than the predetermined distance threshold 324, the device 302 can remain unlocked. If the distance 320 is at or exceeds the predetermined distance threshold 324, the device 302 can be automatically locked, thereby improving computer security.

Figure 4:
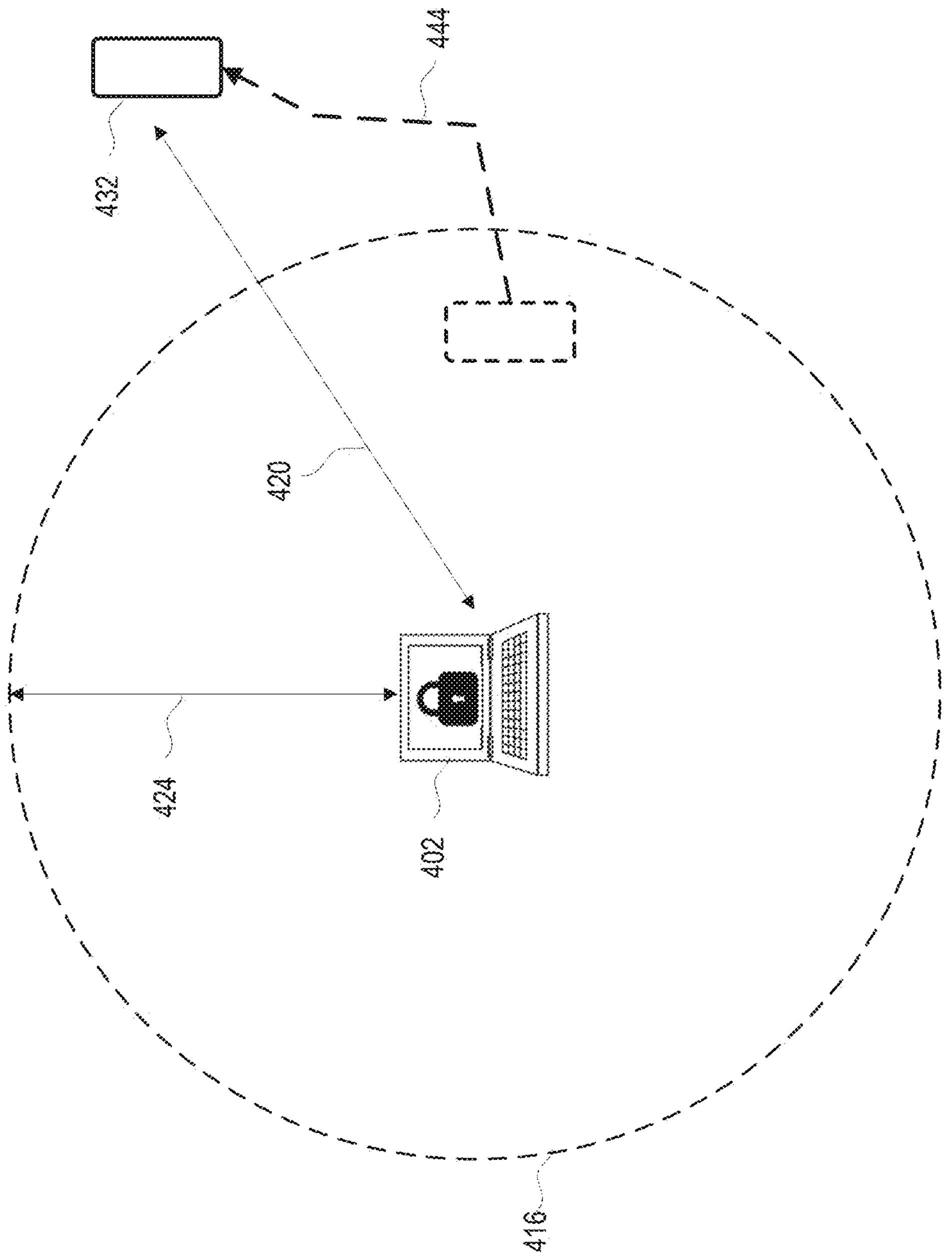
FIG. 4 depicts an example of an electronic device transitioning to a locked state based on Bluetooth channel sounding with a second electronic device, according to one or more embodiments.

FIG. 4 depicts an example of a device transitioning to a locked state based on Bluetooth channel sounding with a second device, according to one or more embodiments. Electronic device 402 may be an electronic device similar to that shown and described as electronic device 100 in FIG. 1. Second electronic device 432 may be an electronic device similar to that shown and described as electronic device 180 in FIG. 1 and/or device 200 in FIG. 2. Continuing from the example shown in FIG. 3, device 432 has been moved (e.g., carried by a user), along path 444 to a distance 420 from the electronic device 402. Distance 420 is greater than predetermined distance threshold 424. In response to the device 432 being positioned outside of the security region 416, the electronic device 402 transitions to the locked state. In one or more embodiments, in response to motion detected by the second electronic device 432, a motion initiation message is sent to the electronic device 402, instructing the electronic device 402 to initiate a BLE channel sounding process to determine the distance 420 between the electronic device 402 and the second electronic device 432.

Figure 5:
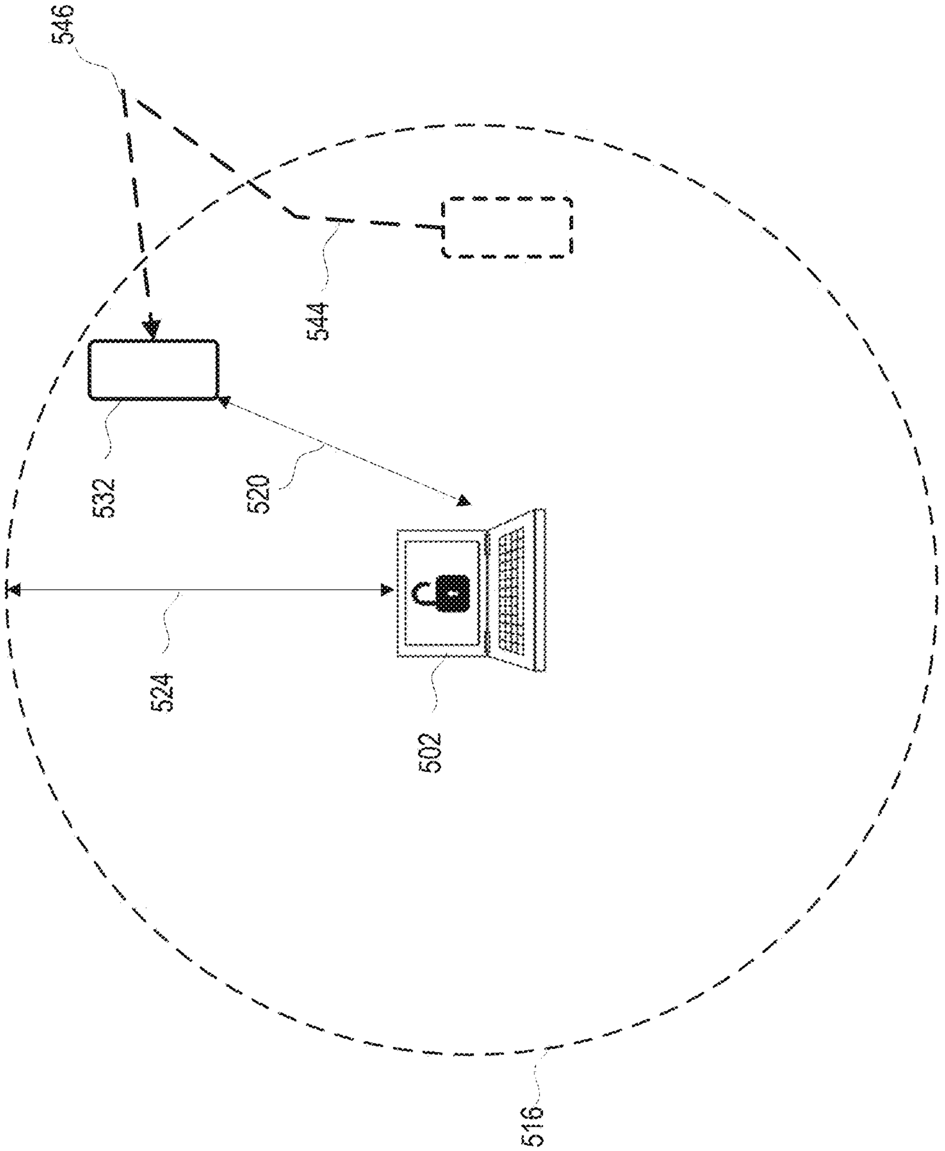
FIG. 5 depicts another example of an electronic device in an unlocked state, according to one or more embodiments.

FIG. 5 depicts another example of a device in an unlocked state, according to one or more embodiments. Electronic device 502 may be an electronic device similar to that shown and described as electronic device 100 in FIG. 1. Second electronic device 532 may be an electronic device similar to that shown and described as electronic device 180 in FIG. 1 and/or device 200 in FIG. 2. Continuing from the example shown in FIG. 3, device 532 has been moved (e.g., carried by a user), along path 544 to a location 546 that is outside of the security region 516. However, within a predetermined time interval (e.g., less than 10 seconds), the second electronic device 532 moves back to within the limits of the security region 516. Accordingly, the new distance 520 between the electronic device 502 and the second electronic device 532, before expiration of the predetermined time interval, is less than the predetermined distance threshold 524, and accordingly, the electronic device 502 remains unlocked. That is, the electronic device 502 did not lock, even when the second electronic device was at location 546, because within the predetermined time threshold, the second electronic device returned to a location within the security region 516. The distance 520 to the final device location is less than predetermined distance threshold 524. Accordingly, disclosed embodiments delay locking of the electronic device for a predetermined interval of time after the second electronic device 532 is moved/positioned outside of the security region 516, in case the second electronic device 532 quickly returns to a position within the security region 516, as depicted in FIG. 5. In one or more embodiments, the predetermined time interval is a value ranging from 10 seconds to 15 seconds. Other values are possible in one or more embodiments.

Figure 6:
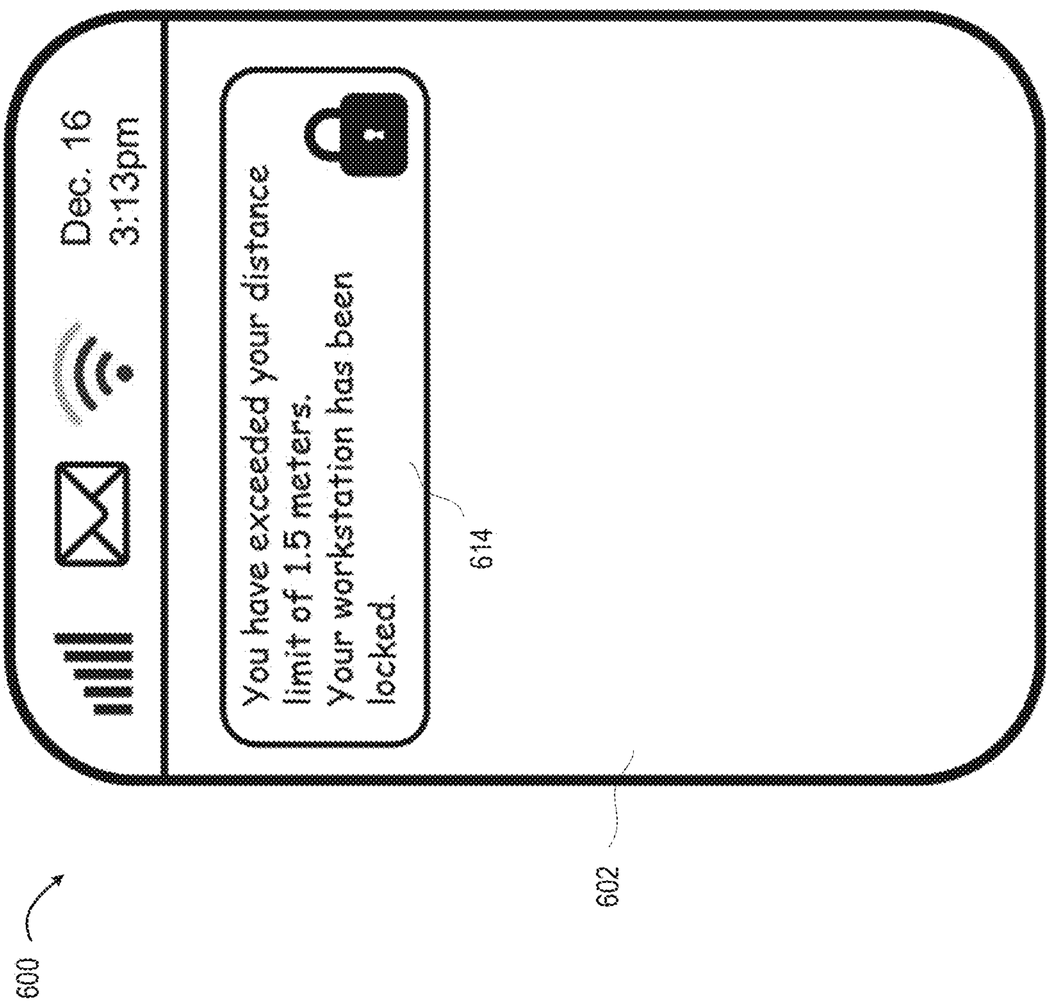
FIG. 6 illustrates an exemplary user interface showing a lock screen activation message, according to one or more embodiments.

FIG. 6 illustrates an exemplary user interface showing a lock screen activation message, according to one or more embodiments. Device 600 may be an electronic device similar to that shown and described as electronic device 180 in FIG. 1 and/or device 200 in FIG. 2. Device 600 includes display 602. Rendered on display 602 is lock screen activation message 614, which indicates that an associated electronic device (e.g., 402 of FIG. 4) is locked, based on a distance between two electronic devices, as determined by a BLE channel sounding process. The lock screen activation message can be based on information sent by the electronic device that entered a lock state, based on the distance between the two devices exceeding the threshold distance for greater than the threshold period of time. As an example, referring again to FIG. 4, device 402 can send a message to device 432 to trigger device 432 to render a message such as shown at 614. One or more embodiments can include sending a lock screen activation message to the second electronic device after invoking the lock screen on the electronic device.

Figure 7:
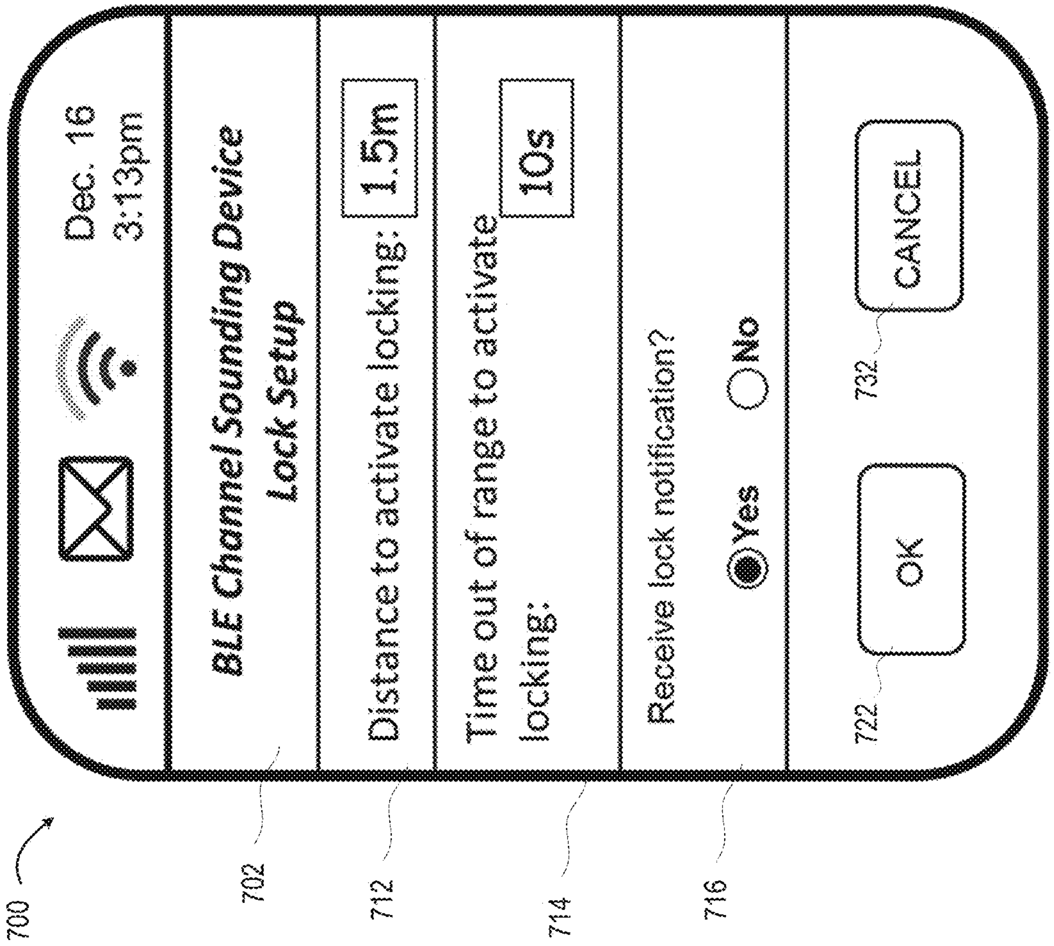
FIG. 7 illustrates an exemplary BLE channel sounding device lock setup user interface, according to one or more embodiments.

FIG. 7 illustrates an exemplary BLE channel sounding device lock setup user interface, according to one or more embodiments. Device 700 may be an electronic device similar to that shown and described as electronic device 180 in FIG. 1 and/or device 200 in FIG. 2. Device 700 includes display 702. Rendered on display 702 is a BLE channel sounding device lock setup user interface, which includes multiple options. Option 712 includes a data entry field to specify a distance to activate locking. In the example of FIG. 7, a value of 1.5 meters is shown. The value shown may be the value entered by the user or a default value that can be modified by the user. Option 714 includes a data entry field to specify a time interval to wait before activate locking. In the example of FIG. 7, a value of 10 seconds is shown. The time interval to wait before activating locking specifies how much time must elapse with the second electronic device being at a distance beyond the value specified in option 712, before the motion initiation message is sent to start the BLE channel sounding process. In this way, BLE channel sounding is not initiated during a brief movement of the second electronic device (or the electronic device) outside of the security region, potentially saving resources such as bandwidth and battery power of the devices, while also reducing annoyances from locking a device unnecessarily. Option 716 includes a selection to receive a lock notification, such as depicted in FIG. 6, when an associated electronic device locks due to a distance between the device 700 and an associated electronic device (e.g., such as device 302 in FIG. 3). OK button 722, when invoked, causes the processor of device 700 to apply the changes specified in options 712, 714, and 716. Similarly, cancel button 732, when invoked, causes the processor of device 700 to discard any unsaved changes specified in options 712, 714, and 716.

Figure 8:
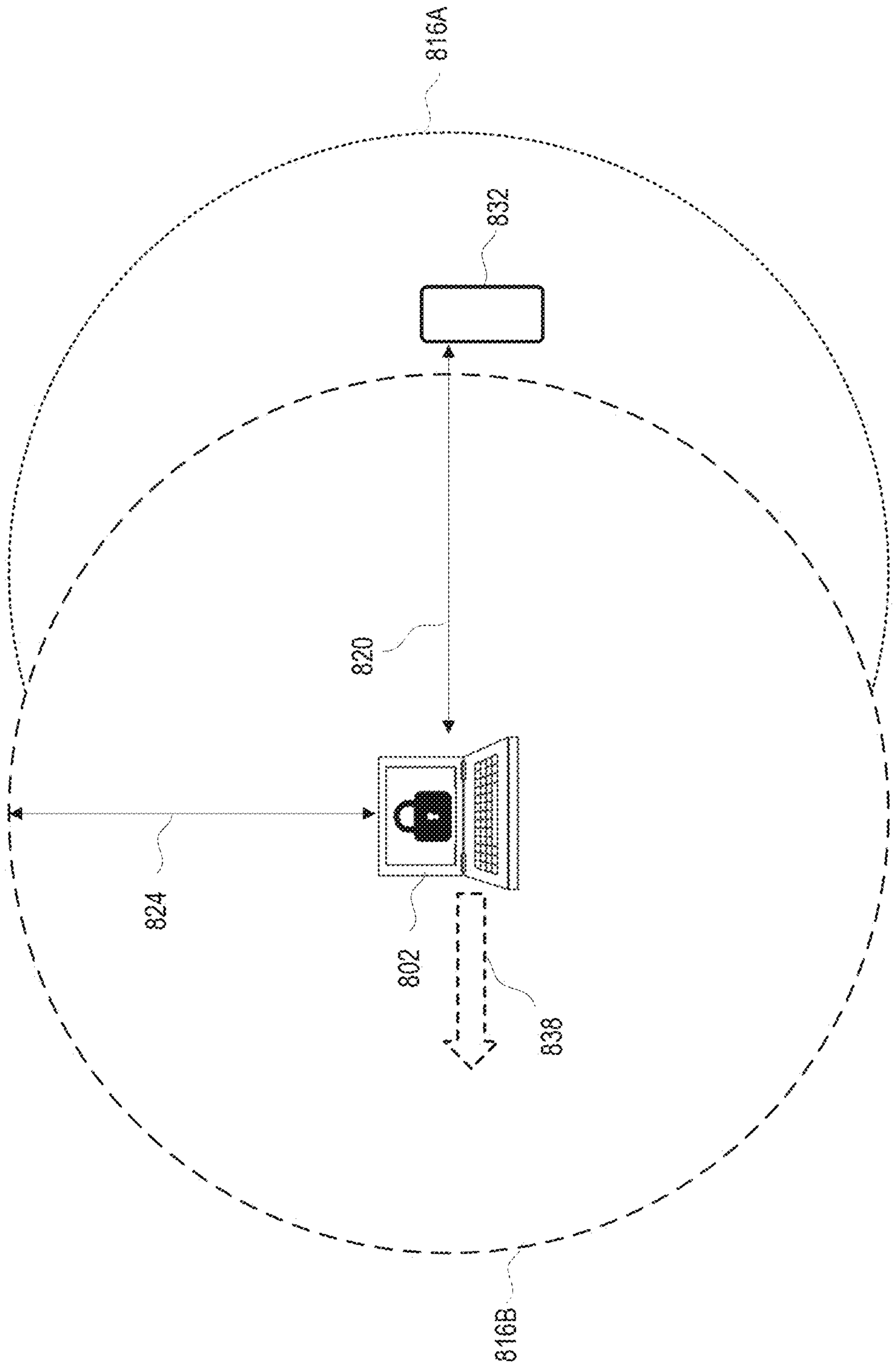
FIG. 8 depicts an example of a device being moved away from a second electronic device to outside of an unlock/lock boundary, causing the device to transition to a locked state based on Bluetooth channel sounding with the second electronic device, according to one or more embodiments.

FIG. 8 depicts another example of a device transitioning to a locked state based on Bluetooth channel sounding, according to one or more embodiments. Electronic device 802 may be an electronic device similar to that shown and described as electronic device 100 in FIG. 1. Second electronic device 832 may be an electronic device similar to that shown and described as electronic device 180 in FIG. 1 and/or device 200 in FIG. 2. In the case depicted by FIG. 8, the first electronic device 802 is moved. As an example, if the first electronic device 802 is a laptop computer, there can be a scenario in which a user leaves his/her smartphone (e.g., second electronic device 832) on a desk. The user then picks up and moves his/her laptop (e.g., electronic device 802) in a direction indicated by arrow 838, such that the distance 820 between the electronic device 802 and the second electronic device 832 now exceeds the predetermined distance threshold 824, and accordingly, the electronic device 802 becomes locked. Moving the electronic device 802 in the direction indicated by arrow 838 effectively moves the security region from the original location indicated by security region 816A such that the second electronic device 832 is no longer within the limits of the security region 816A and the security region 816B, which tracks the position of electronic device 802, no longer encompasses second electronic device 832. Accordingly, the device 802 becomes locked based on the motion of the device 802, rather than the motion of second electronic device 832. In the scenario depicted in FIG. 8, a motion sensor (e.g., 136 of FIG. 1) onboard the electronic device 802 causes the processor within electronic device 802 to initiate the BLE channel sounding sequence. Accordingly, one or more embodiments can accommodate either device (802 or 832) being moved away from the other device to trigger device locking based on a distance determined by BLE channel sounding.

Thus, in one or more embodiments, in response to determining the second electronic device 832 has transitioned out of and is no longer within the security region 816 while electronic device 802 is operating, electronic device 802 transitions to a locked state. In one or more embodiments, the transition to the locked state may not be immediate and may involve first surfacing a message visibly displayed on the device screen or audibly with the device speakers indicating that the electronic device 802 is transitioning to the locked state because of non-detection of the second electronic device 822. The notification may provide the user with an option to reverify that the user is still present at the device by entering a security code/passcode or biometric authentication at the electronic device 802 before a time-out period (e.g. 60 seconds). This entry can verify that the device should not transition to the locked state despite the second electronic device not being physically detected within the security region 816. Examples of the applicability of this embodiment can be the situation where a spouse or child takes the user's phone away to make a phone call while the user remains working at his/her computer.

Figure 9:
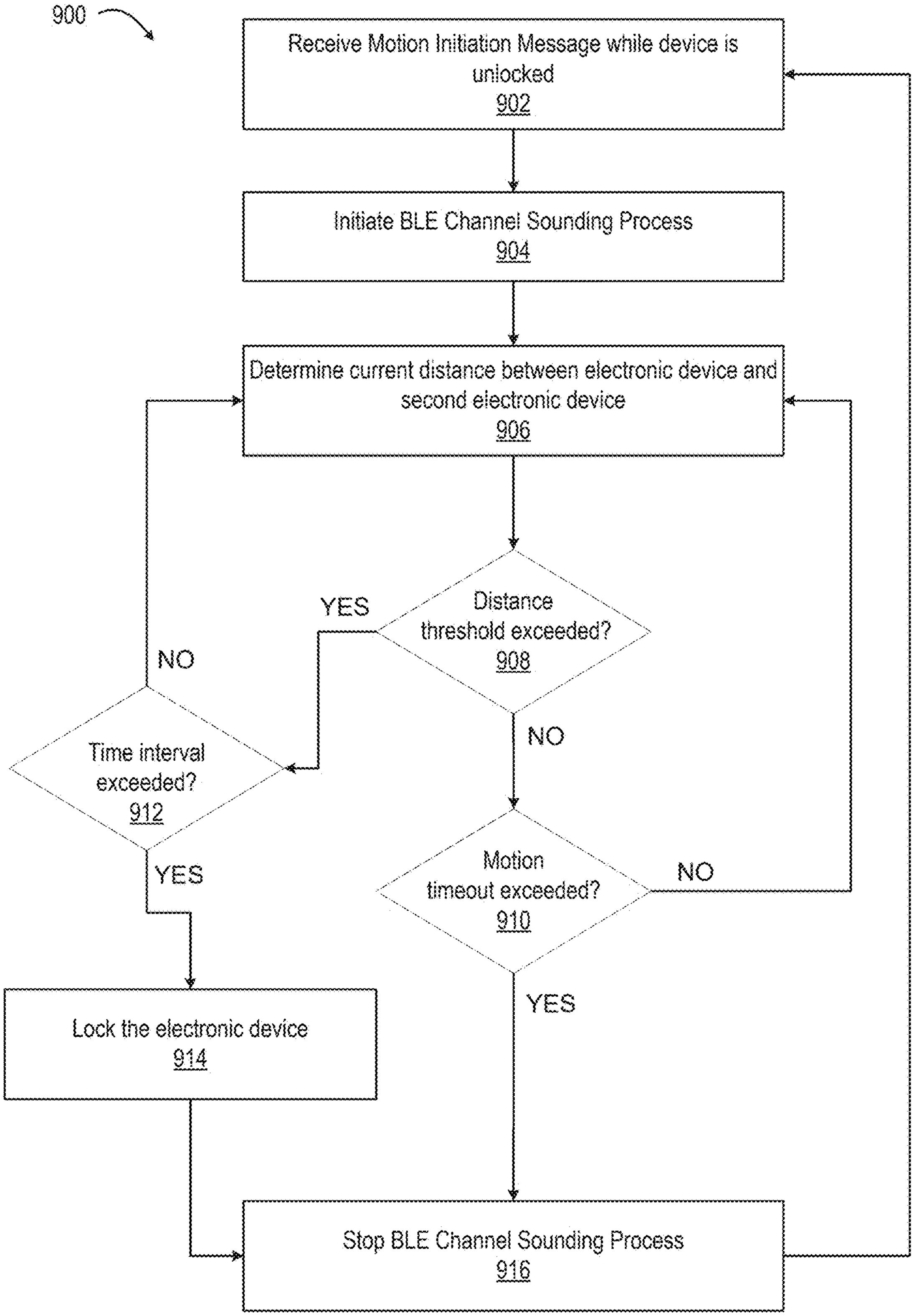
FIG. 9 depicts a flowchart of a method for locking an electronic device using Bluetooth channel sounding in a connected device context with a second electronic device, according to one or more embodiments.

Referring now to the flowchart presented by FIG. 9, the description of the method in FIG. 9 is provided with general reference to the specific components and features illustrated within the preceding FIGS. 1-8. Specific components referenced in the method of FIG. 9 may be identical or similar to components of the same name used in describing preceding FIGS. 1-8. In one or more embodiments, processor 102 (FIG. 1) configures electronic device 100 (FIG. 1) to provide the described functionality of the method of FIG. 9 by executing program code for one or more modules or applications provided within system memory 120 of electronic device 100, including device lock module 168 (FIG. 1).

FIG. 9 depicts a flowchart of a method 900 for locking an electronic device using Bluetooth channel sounding in a connected device context, based on a determined distance of a second electronic device, according to one or more embodiments. The method 900 starts at block 902, where a motion initiation message is received while the electronic device is unlocked. The method 900 continues to block 904, where a BLE Channel Sounding process is initiated in response to receiving the motion initiation message. The BLE channel sounding process can include establishing a BLE connection, exchanging capabilities and negotiating configurations, and/or enabling channel sounding security. The method 900 continues to block 906, where a current distance between the electronic device and second electronic device is determined. In one or more embodiments, the distance measuring procedure can include generating and sending multiple channel sounding subevents, followed by exchanging measurement results, based on the distance algorithm used to compute data from the multiple channel sounding subevents.

The method 900 then continues to block 908, where a check is made to determine if the measured distance exceeds a predetermined threshold (e.g., such as specified at option 712 of FIG. 7). If, at block 908, it is determined that the current distance exceeds the predetermined threshold, then the method 900 continues to block 912, where a check is made to determine if a current elapsed time since the separation distance has exceeded the predetermined threshold exceeds a predetermined time interval (e.g., such as specified at option 714 of FIG. 7). One or more embodiments can include, prior to invoking the lock screen: monitoring a time during which the current distance exceeds the predetermined distance threshold; and invoking the lock screen in response to determining that the current distance exceeds the predetermined distance threshold for a predetermined time interval. If, at block 912, it is determined that the time interval is not exceeded, then the method 900 returns to block 906 to continue monitoring the current distance between the two electronic devices (e.g., 302 and 332 of FIG. 3). If, at block 912, it is determined that the time interval is exceeded, then the method 900 continues to block 914, where the electronic device is locked. One or more embodiments can include monitoring a time during which the current distance exceeds the predetermined distance threshold; and invoking the lock screen in response to determining that the current distance exceeds the predetermined distance threshold for a predetermined time interval. The locking of the electronic device can include displaying a lock screen on a display associated with the electronic device. In one or more embodiments, authentication data, such as a passcode, PIN, multifactor authentication (MFA) data, and/or biometric data is required in order to unlock the electronic device once the electronic device is in the locked state. The method 900 then continues to block 916, where the BLE channel sounding process is stopped. Thus, one or more embodiments can include stopping the BLECS process after invoking the lock screen on the electronic device. Notably, according to one or more aspects, once the device is unlocked by the user, a new connection between the two devices is established before any re-locking of the first device can be triggered. Thus, if the first device is unlocked by the user entering login credential data or other authorization data and the second device is not within the predetermined distance, no re-locking of the first device is triggered, and the second device has to first be brought back into proximity with the second device and the BLE monitoring feature re-activated before monitoring of a separation distance between the two devices can be triggered. The method 900 then may return to block 902 to await a subsequent motion initiation message, and the method 900 may then repeat as required.

If, at block 908, it is determined that the current distance does not exceed the predetermined threshold, then the method 900 continues to block 910, where a check is made to determine if a motion timeout is exceeded. In one or more embodiments, the motion timeout may have a value ranging from 5 seconds to 20 seconds. In one or more embodiments, the motion timeout may be detected by periodic/continuous monitoring of the current distance, based on the BLE channel sounding. If the determined distance has not changed by more than a predetermined percentage over the time interval as specified by the motion timeout, then the motion timeout is exceeded, and the process continues to block 916 where the BLE channel sounding process is stopped. If, at block 910, the motion timeout is not exceeded, then the method 900 continues to block 906, where the current separation distance continues to be monitored. In this way, scenarios such as a user briefly picking up his/her phone, and then placing it back on the desk, do not cause indefinite BLE channel sounding to occur. After the motion timeout, the BLE channel sounding process stops, and the method 900 returns to block 902 for further processing of subsequent motion initiation messages.

As can now be appreciated, disclosed embodiments provide techniques for conveniently and accurately locking an electronic device based on the distance between the electronic device and a second electronic device, as measured by a BLE channel sounding technique. Locking the display can prevent someone from tampering with an unattended computer and/or accessing its accounts, reducing the risk of data theft or other malicious activities. Moreover, in some industries or organizations, there may be regulations or policies that require locking the display when the computer is unattended to comply with data protection and security standards. Furthermore, in a professional setting, locking the display when stepping away from the computer is a common practice that demonstrates professionalism and respect for security protocols. Thus, disclosed embodiments can improve computer security, by helping users to implement good security habits, such as automatically locking a computer when unattended by the user who has moved away from the computer.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

a communication subsystem that communicatively connects the electronic device to an electronically paired second electronic device, wherein the communication subsystem includes a Bluetooth Low Energy (BLE) interface;

a processor; and a memory storing instructions executable in the processor, the instructions when executed causing the processor to:

receive a motion initiation message from the second electronic device while the electronic device is unlocked, wherein the motion initiation message is sent from the second electronic device to the electronic device in response to the second electronic device detecting motion of the second electronic device;

in response to receiving the motion initiation message from the second electronic device while the electronic device is in the unlocked state, initiate a BLE Channel Sounding (BLECS) process using a distance calculation algorithm, wherein the BLECS process comprises sending periodic channel sounding subevents, and obtaining distance measurement results corresponding to the periodic channel sounding subevents;

determine a current distance between the electronic device and the second electronic device based on the distance measurement results; and in response to determining that the current distance exceeds a predetermined distance threshold, invoke a lock screen on the electronic device.

2. The electronic device of claim 1, wherein further the processor stops the BLECS process after invoking the lock screen on the electronic device.

3. The electronic device of claim 1, wherein further the processor sends a lock screen activation message to the second electronic device after invoking the lock screen on the electronic device.

4. The electronic device of claim 1, wherein further the processor, prior to invoking the lock screen: monitors a time during which the current distance exceeds the predetermined distance threshold; and invokes the lock screen in response to determining that the current distance exceeds the predetermined distance threshold for a predetermined time interval.

5. The electronic device of claim 4, wherein the predetermined time interval is a value ranging from 10 seconds to 15 seconds.

6. The electronic device of claim 1, wherein the distance calculation algorithm includes at least one of Time of Flight (ToF), Channel Impulse Response (CIR), Angle of Arrival (AoA), and Time Difference of Arrival (TDoA).

7. The electronic device of claim 1, wherein the predetermined distance threshold is a value ranging from 50 centimeters to 60 centimeters.

8. A method comprising:

receiving, by a processor of an electronic device that includes a Bluetooth Low Energy (BLE) interface, a motion initiation message from a second electronic device while the electronic device is unlocked, wherein the motion initiation message is sent from the second electronic device to the electronic device in response to the second electronic device detecting motion of the second electronic device;

in response to receiving the motion initiation message from the second electronic device while the electronic device is in the unlocked state, initiating a BLE Channel Sounding (BLECS) process using a distance calculation algorithm, wherein the BLECS process comprises sending periodic channel sounding subevents, and obtaining distance measurement results corresponding to the periodic channel sounding subevents;

determining a current distance between the electronic device and the second electronic device based on the distance measurement results; and in response to determining that the current distance exceeds a predetermined distance threshold, invoking a lock screen on the electronic device.

9. The method of claim 8, further comprising stopping the BLECS process after invoking the lock screen on the electronic device.

10. The method of claim 8, further comprising sending a lock screen activation message to the second electronic device after invoking the lock screen on the electronic device.

11. The method of claim 8, further comprising:

monitoring a time during which the current distance exceeds the predetermined distance threshold; and invoking the lock screen in response to determining that the current distance exceeds the predetermined distance threshold for a predetermined time interval.

12. The method of claim 11, wherein the predetermined time interval is a value ranging from 10 seconds to 15 seconds.

13. The method of claim 8, wherein the distance calculation algorithm includes at least one of Time of Flight (ToF), Channel Impulse Response (CIR), Angle of Arrival (AoA), and Time Difference of Arrival (TDoA).

14. The method of claim 8, wherein the predetermined distance threshold is a value ranging from 50 centimeters to 60 centimeters.

15. A computer program product comprising a non-transitory computer readable medium having program instructions that when executed by a processor of an electronic device that includes a Bluetooth Low Energy (BLE) interface, configure the electronic device to perform functions comprising:

receiving a motion initiation message from a second electronic device while the electronic device is in an unlocked state, wherein the motion initiation message is sent from the second electronic device to the electronic device in response to the second electronic device detecting motion of the second electronic device;

in response to receiving the motion initiation message from the second electronic device while the electronic device is in the unlocked state, initiating a BLE Channel Sounding (BLECS) process using a distance calculation algorithm, wherein the BLECS process comprises sending periodic channel sounding subevents, and obtaining distance measurement results corresponding to the periodic channel sounding subevents;

determining a current distance between the electronic device and the second electronic device based on the distance measurement results; and in response to determining that the current distance exceeds a predetermined distance threshold, invoking a lock screen on the electronic device.

16. The computer program product of claim 15, further comprising program instructions for stopping the BLECS process after invoking the lock screen on the electronic device.

17. The computer program product of claim 15, further comprising program instructions for sending a lock screen activation message to the second electronic device after invoking the lock screen on the electronic device.

18. The computer program product of claim 15, further comprising program instructions for:

monitoring a time during which the current distance exceeds the predetermined distance threshold; and invoking the lock screen in response to determining that the current distance exceeds the predetermined distance threshold for a predetermined time interval.

19. The computer program product of claim 18, further comprising program instructions for setting the predetermined time interval to a value ranging from 10 seconds to 15 seconds.

20. The computer program product of claim 15, further comprising program instructions for setting the predetermined distance threshold to a value ranging from 50 centimeters to 60 centimeters.

* * * * *